United States Patent [19]

Jones

[11] Patent Number: 5,292,476
[45] Date of Patent: Mar. 8, 1994

[54] METHOD OF MAKING A VISOR

[75] Inventor: Bryan G. Jones, West Olive, Mich.

[73] Assignee: Prince Corporation, Holland, Mich.

[21] Appl. No.: 951,381

[22] Filed: Sep. 25, 1992

Related U.S. Application Data

[62] Division of Ser. No. 763,923, Sep. 23, 1991, abandoned.

[51] Int. Cl.$^5$ .............................................. B29C 67/22
[52] U.S. Cl. ..................... 264/46.6; 264/46.7; 264/267; 264/271.1
[58] Field of Search .............. 264/46.4, 46.5, 46.6, 264/46.7, 267, 271.1

[56] References Cited

U.S. PATENT DOCUMENTS

| | | | |
|---|---|---|---|
| 2,901,038 | 8/1959 | Herr et al. | 296/97.1 |
| 2,970,863 | 2/1961 | Herr | 296/97.9 |
| 3,193,323 | 7/1965 | Herr et al. | |
| 3,429,610 | 2/1969 | Bornefeld | |
| 3,542,416 | 11/1970 | Nelson et al. | 296/97.1 |
| 3,694,530 | 9/1972 | Wolfe | 264/46.6 |
| 3,716,269 | 2/1973 | Herr et al. | |
| 3,751,106 | 8/1973 | Mahler et al. | |
| 3,827,748 | 8/1974 | Herr et al. | |
| 3,926,470 | 12/1975 | Marcus | |
| 4,077,821 | 3/1978 | Duerfling | 264/46.4 |
| 4,227,241 | 10/1980 | Marcus | |
| 4,411,467 | 10/1983 | Cziptschirsch et al. | |
| 4,458,938 | 7/1984 | Viertel et al. | |
| 4,477,116 | 10/1984 | Viertel et al. | |
| 4,494,789 | 1/1985 | Flowerday | |
| 4,570,990 | 2/1986 | Flowerday | |
| 4,576,409 | 3/1986 | Ebert | |
| 4,610,443 | 9/1986 | Ebert et al. | 264/278 |
| 4,610,477 | 9/1986 | Ebert et al. | 264/138 |
| 4,702,513 | 10/1987 | Ebert et al. | |
| 4,743,328 | 5/1988 | Zwirner | 156/274.4 |
| 4,763,946 | 8/1988 | Robbins et al. | |
| 4,822,095 | 4/1989 | Svensson | 296/97.1 |
| 4,908,170 | 3/1990 | Kurimoto | 264/46.6 |
| 4,998,767 | 3/1991 | Lawassani et al. | 296/97.1 |
| 5,004,288 | 4/1991 | Viertel et al. | 296/97.11 |
| 5,007,532 | 4/1991 | Binish | 296/97.1 |

FOREIGN PATENT DOCUMENTS

| | | | |
|---|---|---|---|
| 2755836 | 6/1979 | Fed. Rep. of Germany | 264/46.6 |
| 2396666 | 3/1979 | France | |
| 2000074 | 1/1979 | United Kingdom | 264/46.6 |

*Primary Examiner*—Allan R. Kuhns
*Attorney, Agent, or Firm*—Price, Heneveld, Cooper, DeWitt & Litton

[57] ABSTRACT

A method of forming a vehicle accessory embodying the present invention includes the provision of a fabric or other upholstery material in the shape of a container which when filled with an amorphous filler material defines an accessory such as a visor, introducing an amorphous material such as a mixture of expandable chemicals into the container so formed and allowing them to expand and cure while constraining the major sides of the container during curing thereby forming an accessory core and integral cover. Visors embodying a preferred embodiment of the present invention comprise an integral cover and structural core of an amorphous material introduced to fill the cover and which is bonded thereto. In a preferred embodiment, the cover is formed from a butterfly pattern which is folded and has edges joined with the exception of an opening at one corner and which is subsequently inverted to define the visor-shaped container.

8 Claims, 4 Drawing Sheets

METHOD OF MAKING A VISOR

This is a divisional of application Ser. No. 07/763,923, filed Sep. 23, 1991 now abandoned.

The present invention pertains to visors and particularly to the construction of an integral visor body and covering.

Visors have been manufactured in a variety of manners for several years. Some construction utilizes a folded polymeric core with a fabric wrapping which is adhered to the edges of the core as disclosed, for example, in U.S. Pat. No. 4,570,990. An adhesive and/or fusion process is employed for holding the fabric to the facing edges of this clamshell visor construction. Other visors have also employed polymeric visor cores which are fabricated covered and which have edge beads or welting material secured by, for example, stitching through the edges of the core for providing a trim edge to the visor. Such construction is disclosed, for example, in U.S. Pat. No. 3,926,470. A snap together visor core construction for holding the upholstery material to provide a trim appearing visor is disclosed in U.S. Pat. No. 4,763,946.

Other core materials have also been used for visors. U.S. Pat. Nos. 3,193,323; 3,429,610; and 3,716,269 disclose foam core visors which employ a foam material reinforced by a wire or other frame structure which is subsequently covered with a polymeric material typically seam welded. Such visors have been in existence in European vehicles for many years.

More recently, visors have included a fiberboard core material which can be covered in a conventional manner such as by stitching or the like. One unique visor construction utilizes a folded fiberboard core in which no fabric stitching is required is disclosed in U.S. Pat. No. 5,007,532.

In all of these visor constructions, the upholstery material is added to a pre existing core structure and subsequent cutting, bonding, welding, trimming, seaming, or other finishing steps are required. Although the resultant visors have, in recent years, provided a modern clean edge without the additional use of trim beads, the visor manufacturing requires multiple steps and significant additional costs both in terms of labor and machinery required to accomplish the upholstery techniques employed.

SUMMARY OF THE PRESENT INVENTION

The vehicle accessory such as a visor of the present invention overcomes the above noted problems with the prior art by providing an integral visor construction in which the visor covering itself is employed as a container for an amorphous filler material such as an expandable injectable material which expands to fill the visor cover in a constrained manner thereby forming the visor. In a preferred embodiment, the material is a two part structural foam which expands and bonds to the interior of the cover to define a generally planar visor body in which the cover is integral with the core. A method of forming a vehicle accessory such as a visor embodying the present invention includes the provision of a fabric or other upholstery material in the shape of a visor defining a container having an opening for receiving an injection nozzle; injecting an amorphous material such as a mixture of expandable chemicals into the container so formed and allowing them to expand and cure while constraining the major sides of the container during curing thereby forming a vehicle accessory such as a visor having a core and integral cover.

Visors embodying a preferred embodiment of the present invention comprise an integral cover and structural foam core bonded thereto. In a preferred embodiment, the cover is formed from a butterfly pattern which is folded and has edges joined with the exception of an opening at one corner and which is subsequently inverted to define the visor-shaped container.

The visor of the present invention results in a visor with a cover which is wrinkle free since it is bonded directly to the core material which expands to fill the visor-shaped container. The cost of the visor is significantly reduced since typical assembly and finishing steps and equipment are eliminated. These and other features, objects and advantages of the present invention will become apparent upon reading the following description thereof together with reference to the accompanying drawings in which:

DETAILED DESCRIPTION OF THE PREFERRED EMBODIMENT

Figure 1:
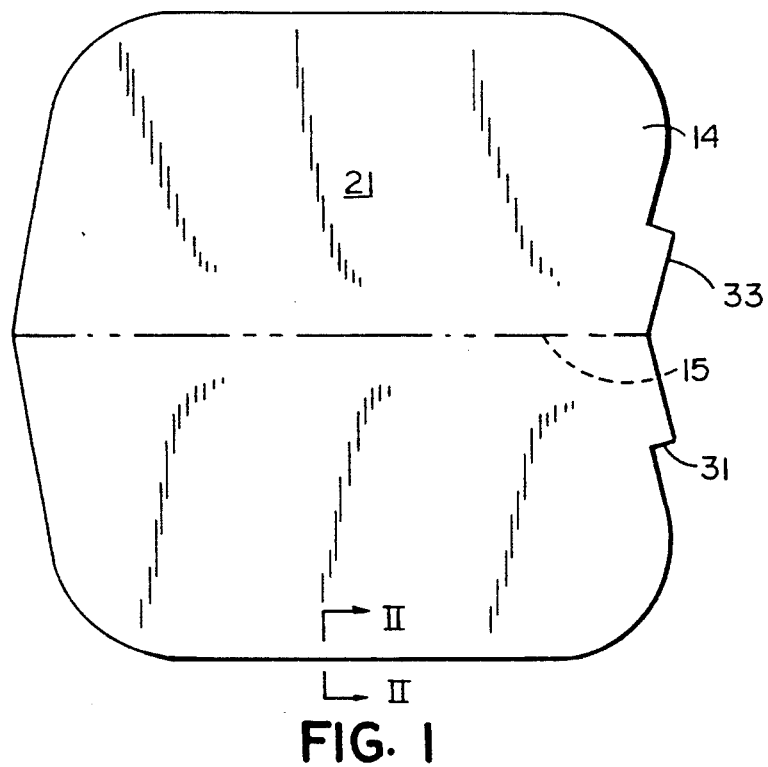
FIG. 1 is a top plan view of an upholstery pattern which forms the visor container of the present invention.
Figure 4:
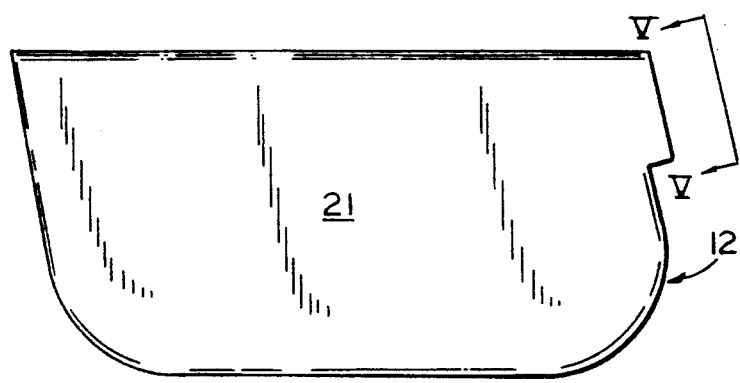
FIG. 4 is a top plan view of the structure shown in FIG. 3 once inverted.
Figure 2:
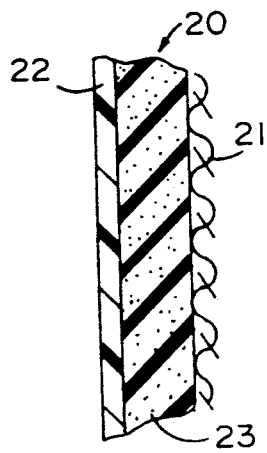
FIG. 2 is a enlarged fragmentary cross-sectional view of the material shown in FIG. 1 taken along section line II—II.

A visor 10 of the present invention (FIGS. 8-10) is made from a visor-shaped container 12 shown in FIG. 4 which, in turn, is formed from a pattern 14 of material as seen in FIG. 1. The material 14 can be any generally impermeable material such as leather, plastic or a sealed fabric material as in the preferred embodiment. The material employed in the preferred embodiment is best seen in FIG. 2 and includes an integral polyester foam back woven fabric material 20 to which there is flame laminated a 0.1 mm polyethylene film 22. Fabric 20 includes a woven fabric outer layer 21 and foam backing 23 which is conventionally used in the vehicle industry for upholstery material. The foam backing and fabric 20 is typically from 0.090 to 0.125 inches in thickness and matches the headliner or other upholstery material of the vehicle. The film backing 22 is bonded to the foam 23 in a conventional flame lamination process or fabric can be purchased which integrally includes material 22. The backing material 22 is impermeable in that it prevents the visor filling material from seeping through the container defined by the pattern as described below during the core forming operation.

The butterfly-shaped pattern 14 includes a fold line 15 shown in dashed lines in FIG. 1 which forms an upper edge 16 of visor 10 (FIG. 8) when completed. The butterfly-shaped pattern 14 is folded along fold line 15 into a position shown in FIG. 3 with the surface 22 facing outwardly. The peripheral edges of the pattern 14 are sealed such as by stitching 18, by ultrasonic welding, or by other suitable sealing means extending around the periphery of the visor configuration defined by the folded pattern 14 of material. No seal is formed in corner area 30 for defining an opening 32 (FIG. 5) to allow the introduction of a nozzle (FIG. 6) for the introduction of a filling material.

Figure 3:
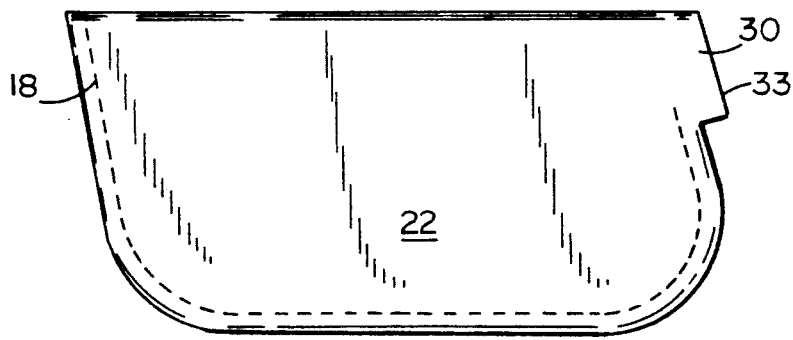
FIG. 3 is a top plan view of the material shown in FIG. 1 after it is folded and the edges are bonded.
Figure 5:
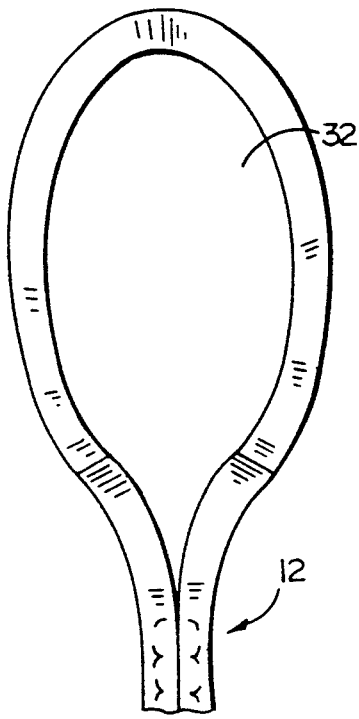
FIG. 5 is a enlarged fragmentary partial cross-sectional view taken along section line V—V of FIG. 4.
Figure 6:
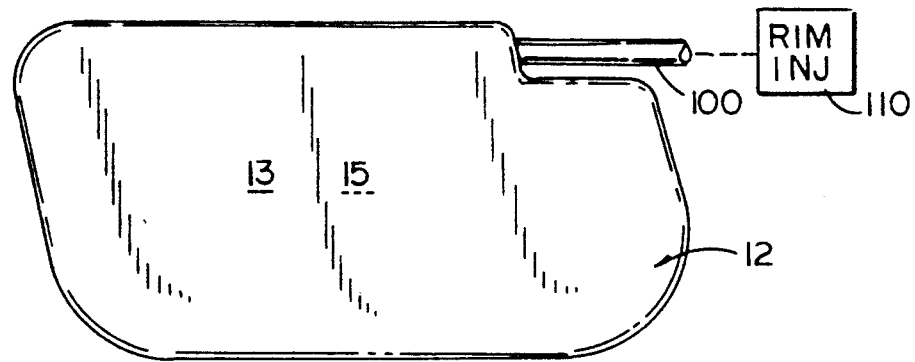
FIG. 6 is a plan view of the visor container and its relationship to the injection nozzle during the injection of filler material.

The sewn pattern 14 as illustrated in FIG. 3, is then inverted into a position shown in FIGS. 4-6 by a suitable known inverting process such as by drawing the corner remote from opening 32 of the panel through the opening 32 to reverse the sock-like container. In this position the upholstery fabric 21 is then on the outer surface and the film sealing layer 22 is on the interior.

The sock-like container is then placed with opening 32 over a nozzle 100 of a reaction injection molding (RIM) machine 110 which injects, in the preferred embodiment, an expandable two-part foam material comprising isocyanate and polyol. Other amorphous filling material such as two-part expandable foams or epoxies may also be used or a moisture curing urethane could, in some embodiments, be employed. As used herein the expression amorphous filler pertains to any suitable material which has no particular shape in and of itself but relies on the container 12 to, at least in part, define its final shape. Such material need not necessarily be in a liquid form but could be, for example, a particulate material which could be introduced into the container. It is necessary that the properties of the amorphous material allow it to fill the container and upon treatment such as curing, heating or the like, impart to the container a rigid structural property. In a preferred embodiment of the invention, the two-part reaction injection molding material was preferred and resulted in a structurally rigid visor. The molding pressure is less than 50 psi with the molding being accomplished at room temperature for the sock like container 12. An amount of liquid reaction injection molding reactants of about 65 grams is employed for an average sized visor having a height of approximately 7¼ inches and an overall length of approximately 14 inches. Naturally, the amount of injected material will vary for different sized visors or other vehicle accessories made in this manner.

Figure 7:
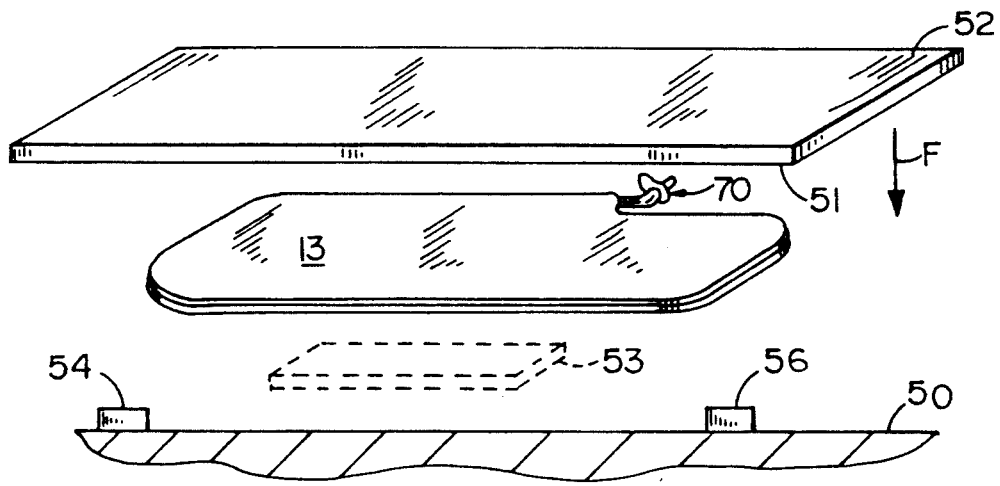
FIG. 7 is an exploded perspective view of the visor during its formation and its placement with respect to a support for holding it during curing.

Subsequent to the injection of the liquid reactants into the container 12, as illustrated in FIG. 6, the container can be laid on a horizontally-extending support surface 50 shown in FIG. 7 and a plate 52 laid thereover during an approximate 45 second curing time during which the liquid material foams and expands to fill the container 12 with its major sides 13 and 15 being constrained between the surface 50 of the lower plate and the lower surface 51 of plate 52 to force the foaming material to expand outwardly to the edges of what becomes the visor body. Prior to the curing of the foam and insertion of the body into the curing press defined by plates 50 and 52, a visor elbow bracket assembly 70 can be inserted through the aperture 32 such that it is locked into place with the foam material extending around the visor rod assembly. Spacers 54 and 56 space the lower surface 51 of plate 52 and support surface 50 defines the thickness of the visor. A force indicated by arrow F in FIG. 7, is conventionally applied to maintain the plates 50 and 52 in the predetermined spaced relationship during the curing process.

Figure 10:
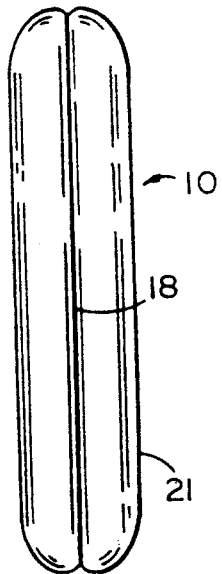
FIG. 10 is a left side elevational view of the visor shown in FIG. 8.
Figure 9:
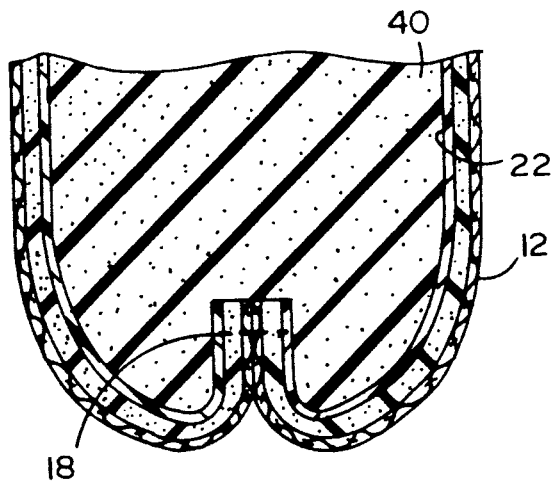
FIG. 9 is an enlarged fragmentary perspective view of an edge of the visor taken along section line IX—IX of FIG. 8.

Upon completion of curing, the structural foam material 40 (FIG. 9) and container now define the visor 10. The upholstery flaps 31 and 33 around the edges of opening 32 are tucked in around the opening 32 to provide a neat finished appearance at the interface of the visor pivot rod assembly 70. The resultant structure is shown in FIGS. 9 and 10 in which the body of visor 10 is filled with a rigid expanded foam filler 40 which bonds to the inner surface 22 of the visor body and is constrained by the container 12 forming the visor skin as it expands. The resultant structure is a lightweight rigid visor which requires very little tooling. It does not require any special molding procedures such as injection pressure or temperature and employs the upholstery fabric as the foam constraining member. In the preferred embodiment of the invention, the isocyanate was an aromatic MDI isocyanate and had a ratio of 152 of isocyanate to 100 parts of polyol. The method of manufacturing the visor 10 shown in FIGS. 1-10 is illustrated by the flow chart of FIG. 11 now described.

Figure 11:
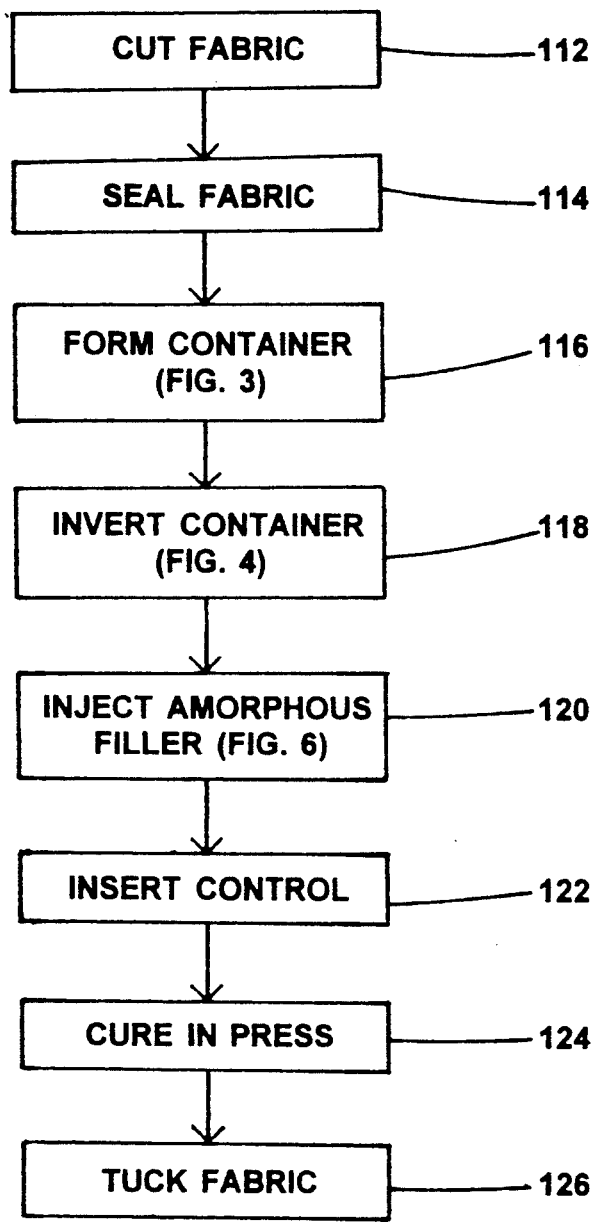
FIG. 11 is a block diagram of the process for manufacturing a visor according to the method of the present invention.

In FIG. 11, the cutting of the fabric pattern 14 is illustrated by block 112. The pattern is the general shape of a butterfly with each half representing the front profile of a visor configuration with flaps 31 and 33, as illustrated in FIG. 1, providing tucking flaps for a neat appearance to the opening 32. Subsequent to the cutting of the fabric, the fabric, if necessary, is sealed as indicated by block 114 such as by flame lamination of an impenetrable or impervious film 22 shown in FIG. 2. Where the fabric is non-porous, this step is unnecessary. Next, the fabric is formed into a sock-like container which has the shape of a visor as illustrated in FIG. 3 by a stitching process as indicated by lines 18 in FIG. 3 or by ultrasonic or other sealing techniques which seal the peripheral edge of the pattern with the exception of opening 32.

Figure 8:
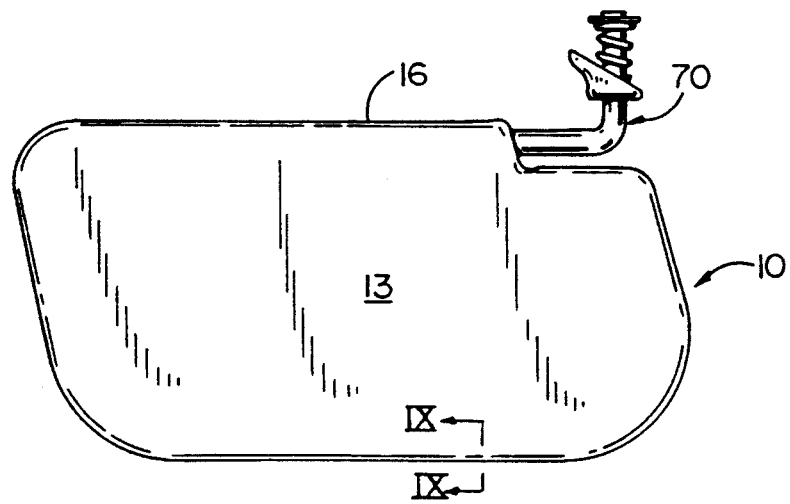
FIG. 8 is a top plan view of a completed visor.

Next, as indicated by block 118, the sock is inverted either manually or by an inversion machine to form a visor appearing container as illustrated in FIG. 4. The next step, as indicated by block 120, is the injection of a filler material such as the reaction injection molding process described above into the opening 32 of the container 12. Next, as indicated by block 122, the pivot rod assembly is inserted into opening 30 and the sock and pivot rod is placed in the press as illustrated in FIG. 7 allowing the chemical reactants to foam and cure forming the shape of the visor as seen in FIG. 8. This is indicated by block 124 in FIG. 11. Finally, as indicated by block 126, the fabric flaps 31 and 33 are tucked around the edge of opening 30 and the visor pivot rod assembly 70 to provide the finished visor illustrated in FIGS. 8-10.

Disclosed herein is the formation of a basic blank visor as it is known in the trade for providing sunshield protection. The press shown in FIG. 7 can be modified to include a rectangular platform 53 extending from base 50 upwardly to define a rectangular recess as the visor is formed for receiving accessories such as a vanity mirror package the type disclosed in U.S. Pat. No. 4,227,241 or the like. The method of manufacturing the specific vehicle accessory, namely a visor can also be used for other vehicle accessories such as armrests, headrests or the like. It will become apparent to those skilled in the art that various modifications to the preferred embodiment of the present invention as described herein can be made without departing from the spirit or scope thereof as defined by the appended claims.

The embodiments of the invention in which an exclusive property or priviledge is claimed are defined as follows:

1. A method of manufacturing a vehicle visor body comprising the steps of providing flexible shaped material having two parts, said parts having substantially identical peripheral edges, substantially defining the peripheral shape of a visor, said edges defining upper and lower elongated sides with spaced ends intersecting said sides to provide at least one upper corner;
   superimposing said parts of said shaped material over one another with said peripheral edge of one part engaging the peripheral edge of the other part;
   sealing said peripheral engaging edges of said parts along substantially the entire length of said peripheral edges of said parts except for an unsealed portion at said corner forming a relatively small opening at said corner;
   drawing the flexible material through said opening to turn said superimposed shaped material inside out to form a flexible container with substantially the entire sealed edges extending into the interior of said container through which filling material can be received;
   injecting an amorphous uncured filling material through said opening into said container to fill said container; and
   curing said filling material to form a rigid visor body.

2. The method as defined in claim 1 wherein said material is one piece and the superimposing step includes the step of folding said material.

3. The method as defined in claim 1 wherein said injecting step includes inserting an injection nozzle into said opening of said container and injecting an expandable foam material therein.

4. The method as defined in claim 1 wherein said injecting step comprises injecting a mixture of isocyanate and polyol.

5. The method of claim 1 in which the upper and lower elongated sides include first and second substantially straight edges with end edges extending therebetween, said unsealed edge portion is located in one of said end edges adjacent said first substantially straight edge and extending only a minor portion of the length of said one end edge.

6. The method as defined in claim 5 in which after said injecting step and before said filling material cures, a pivot rod control element is inserted into said opening along the substantially straight edges.

7. A method of manufacturing a vehicle visor body comprising the steps of providing flexible shaped material having two parts, said parts having substantially identical peripheral edges, substantially defining the peripheral shape of a visor;
   superimposing said parts of said shaped material over one another with said peripheral edge of one part engaging the peripheral edge of the other part;
   sealing said peripheral engaging edges of said parts along substantially the entire length of said peripheral edges of said parts;
   turning said superimposed shaped material inside out to form a flexible container with substantially the entire sealed edges extending into the interior of said container except for an unsealed edge portion which provides an opening in said container through which filling material can be received;
   injecting an amorphous uncured filling material into said container to fill said container;
   placing said container between a pair of planar supports after said injecting step; and
   curing said filling material to form a rigid visor body.

8. A method of manufacturing a vehicle visor body comprising the steps of providing flexible shaped material having two parts, said parts having substantially identical peripheral edges substantially defining the peripheral shape of a visor;
   superimposing said parts of said shaped material over one another with said peripheral edge of one part engaging the peripheral edge of the other part;
   sealing said peripheral engaging edges of said parts along substantially the entire length of said peripheral edges of said parts;
   turning said superimposed shaped material inside out to form a flexible container with substantially the entire sealed edges extending into the interior of said container except for an unsealed edge portion which provides an opening in said container through which filling material can be received;
   injecting an amorphous uncured filling material into said container to fill said container;
   inserting a pivot rod control element into said opening after said injecting step; and
   curing said filling material to form a rigid visor body.

* * * * *